(12) United States Patent
Hwang (10) Patent No.: US 8,040,224 B2
(45) Date of Patent: Oct. 18, 2011

(54) APPARATUS AND METHOD FOR CONTROLLING VIBRATION IN MOBILE TERMINAL

(75) Inventor: Sun-Lyeong Hwang, Gumi-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 600 days.

(21) Appl. No.: 12/170,024

(22) Filed: Jul. 9, 2008

(65) Prior Publication Data

US 2009/0051509 A1 Feb. 26, 2009

(30) Foreign Application Priority Data

Aug. 22, 2007 (KR) .................. 10-2007-0084427

(51) Int. Cl.
*G08B 6/00* (2006.01)
(52) U.S. Cl. .................. 340/407.2; 340/407.1
(58) Field of Classification Search .......... 340/407.2, 340/407.1, 683, 7.6; 455/72, 550.1, 557
See application file for complete search history.

(56) References Cited

U.S. PATENT DOCUMENTS

| | | | | |
|---|---|---|---|---|
| 6,418,323 | B1* | 7/2002 | Bright et al. | 455/550.1 |
| 6,529,744 | B1* | 3/2003 | Birkler et al. | 455/557 |
| 6,674,358 | B1* | 1/2004 | Tinsley | 340/7.63 |
| 6,836,212 | B2* | 12/2004 | Sawinski | 340/539.23 |
| 6,850,782 | B2* | 2/2005 | Bright et al. | 455/567 |
| 6,850,837 | B2* | 2/2005 | Paulauskas et al. | 701/200 |
| 7,019,622 | B2* | 3/2006 | Orr et al. | 340/407.1 |
| 7,327,255 | B2* | 2/2008 | Kassiedass | 340/568.1 |
| 7,542,721 | B1* | 6/2009 | Bonner et al. | 455/41.2 |
| 7,831,208 | B2* | 11/2010 | Nelson et al. | 455/72 |
| 2003/0043037 | A1* | 3/2003 | Lay | 340/568.1 |
| 2006/0022822 | A1* | 2/2006 | Wong et al. | 340/568.1 |

* cited by examiner

*Primary Examiner* — Anh V La
(74) *Attorney, Agent, or Firm* — Jefferson IP Law, LLP (57) ABSTRACT

An apparatus and method for controlling vibration in a mobile terminal are provided. The method includes, upon detecting a key input by a user, determining whether a current feedback signal is detected when an external case with a first vibrator is connected to the mobile terminal, upon detecting the current feedback signal, determining that the external case is connected to the mobile terminal and applying a drive signal to the first vibrator, and controlling the first vibrator to be activated in response to the received drive signal to output a haptic feedback.

28 Claims, 8 Drawing Sheets

APPARATUS AND METHOD FOR CONTROLLING VIBRATION IN MOBILE TERMINAL

PRIORITY

This application claims the benefit under 35 U.S.C. §119(a) of a Korean patent application filed in the Korean Intellectual Property Office on Aug. 22, 2007 and assigned Serial No. 2007-84427, the entire disclosure of which is hereby incorporated by reference.

BACKGROUND OF THE INVENTION

1. Field of the Invention

The present invention relates to a vibration control apparatus and method for determining attachment/detachment of an external case. More particularly, the present invention relates to a vibration control apparatus and method for determining attachment/detachment of an external case depending on detection/non-detection of a current feedback signal from the external case, and controlling a vibrator to output a haptic feedback in a mobile terminal.

2. Description of the Related Art

With the development of communication technologies and manufacturing technologies, mobile terminals have noticeably improved in terms of their memory capacity and the performance of their display devices. These improvements enable various functions that were previously unavailable, such as moving image viewing, Moving Picture Experts Group Phase 1 (MPEG-1) audio layer 3 (MP3) reproduction, mobile Internet, etc. Due to the availability of such functions, functions unrelated to radio communication, such as a camera function and a multimedia playback function, have been added to mobile terminals.

Multimedia functions are increasingly extending their scope of utility due to the improvement of the display devices of mobile terminals and the realization of high-speed communication. Many of these features have already been commercialized, thereby enabling users to use mobile terminals as mobile entertainment systems. Among the multimedia functions, the camera function and the multimedia playback function, which are among the more sought after supplemental functions, enable camera-based photography and result in increased image quality so that users may view Video-On-Demand (VOD).

Due to the development of such technologies, on-line Internet games and/or embedded games that mobile users can enjoy have started attracting attention, and terminals are preferred, in which a device is mounted, by which users can readily and instantaneously control the Internet games and the games being executed under application programs stored in the mobile terminals.

Without a need for a separate keyboard mounted in a mobile terminal, a touchscreen is used as an input device that provides input for an application, and the touchscreen provides an interface by which a user can input commands or information into the terminal by touching icons being displayed on the screen using the user's finger and/or a stylus pen.

Generally, when a user desires to make a call using the mobile terminal, the user presses phone number keys and a Send key by touching the corresponding icons provided on a touchscreen of the display with a stylus pen or a finger, thereby attempting to dial.

Conventionally, the user shifts the cursor displayed on the graphic environment by touching the touchscreen with a fingertip and then moves the finger on the screen. In addition, the user can operate a stylus in association with the touchscreen by pressing a stylus tip on the touchscreen and then moving the stylus.

The touchscreen is used for inputting information via a sensing pad that is layered/covered on a display screen, and this is used in a device such as Personal Digital Assistant (PDA), and other mobile electronic devices.

Recently, the trend in mobile terminals is towards miniaturization and a reduction in weight. However, a touchscreen cannot undergo miniaturization and weight reduction, making it impossible to meet user demands for various and effective control using only an output of a speaker of a mobile terminal. In addition, the user cannot experience the touch sensation that provides information on the target and other control to the user in the graphic environment to assist a user.

Furthermore, unlike with multimedia file playback, the game function has difficulty in delivering true-to-nature feelings using only the vibration of a built-in vibration motor.

SUMMARY OF THE INVENTION

An aspect of the present invention is to address at least the above-mentioned problems and/or disadvantages and to provide at least the advantages described below. Accordingly, an aspect of the present invention is to determine attachment/detachment of an external case depending on detection/non-detection of a current feedback signal from the external case with a vibrator, and to control the vibrator to output a haptic feedback to minimize the required mounting space of a mobile terminal, thereby providing a high vibration force that makes up for the miniaturization.

Another aspect of the present invention is to determine attachment/detachment of an external case depending on detection/non-detection of a current feedback signal from the external case with a vibrator, and to control the vibrator and/or a mobile terminal to output a haptic feedback to increase a vibration force and enable a user to easily recognize the vibration.

A further aspect of the present invention is to enable a vibrator mounted in an external case and a mobile terminal to simultaneously output haptic feedback on an interactive basis to deliver various dynamic vibrations to a user.

Yet another aspect of the present invention is to determine attachment/detachment of an external case depending on detection/non-detection of a current feedback signal from the external case with a vibrator, and to control the vibrator to output a haptic feedback according to a sound output level together with the sound being output from a mobile terminal, thereby providing improved presence and verisimilitude and thus improving convenience to the user.

According to one aspect of the present invention, an apparatus for controlling vibration in a mobile terminal is provided. The apparatus includes a first connector that is attachable and detachable with a mobile terminal, and an external case including a first vibrator electrically connected to the first connector, wherein when the mobile terminal connects with the external case through the first connector, the mobile terminal detects and enables operation of the first vibrator.

According to another aspect of the present invention, an apparatus for controlling vibration in a mobile terminal is provided. The apparatus includes a first connector that is attachable and detachable with a mobile terminal, an external case including a first vibrator electrically connected to the first connector, and a controller for, when the mobile terminal is connected to the external case through the first connector, determining at least one of attachment and detachment of the external case, and for controlling the first vibrator and a second vibrator in the mobile terminal to simultaneously output haptic feedback on an interactive basis.

According to further another aspect of the present invention, a method for controlling vibration in a mobile terminal is provided. The method includes, upon detecting a key input by a user, determining whether a current feedback signal is detected when an external case with a first vibrator is connected to the mobile terminal, upon detecting the current feedback signal, determining that the external case is connected to the mobile terminal and applying a drive signal to the first vibrator, and controlling the first vibrator to be activated in response to the received drive signal to output a haptic feedback.

According to yet another aspect of the present invention, a method for controlling vibration in a mobile terminal is provided. The method includes, upon detecting a key input by a user, determining whether a current feedback signal is detected when an external case with a first vibrator is connected to the mobile terminal, upon detecting the current feedback signal, generating a switching-off control signal, applying a drive signal to the first vibrator according to the switching-off control signal, and controlling the first vibrator to be activated in response to the received drive signal to output a haptic feedback.

According to still another aspect of the present invention, a method is provided for controlling vibration in a mobile terminal. The method includes, upon detecting a key input by a user, determining whether a current feedback signal is detected when an external case with a first vibrator is connected to the mobile terminal, upon detecting the current feedback signal, determining that the external case is connected to the mobile terminal and applying drive signals to the first vibrator and a second vibrator in the mobile terminal, and controlling the first vibrator and the second vibrator to be activated in response to the received drive signal to simultaneously output haptic feedback on an interactive basis.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions incorporated herein are omitted for clarity and conciseness.

Figure 1:
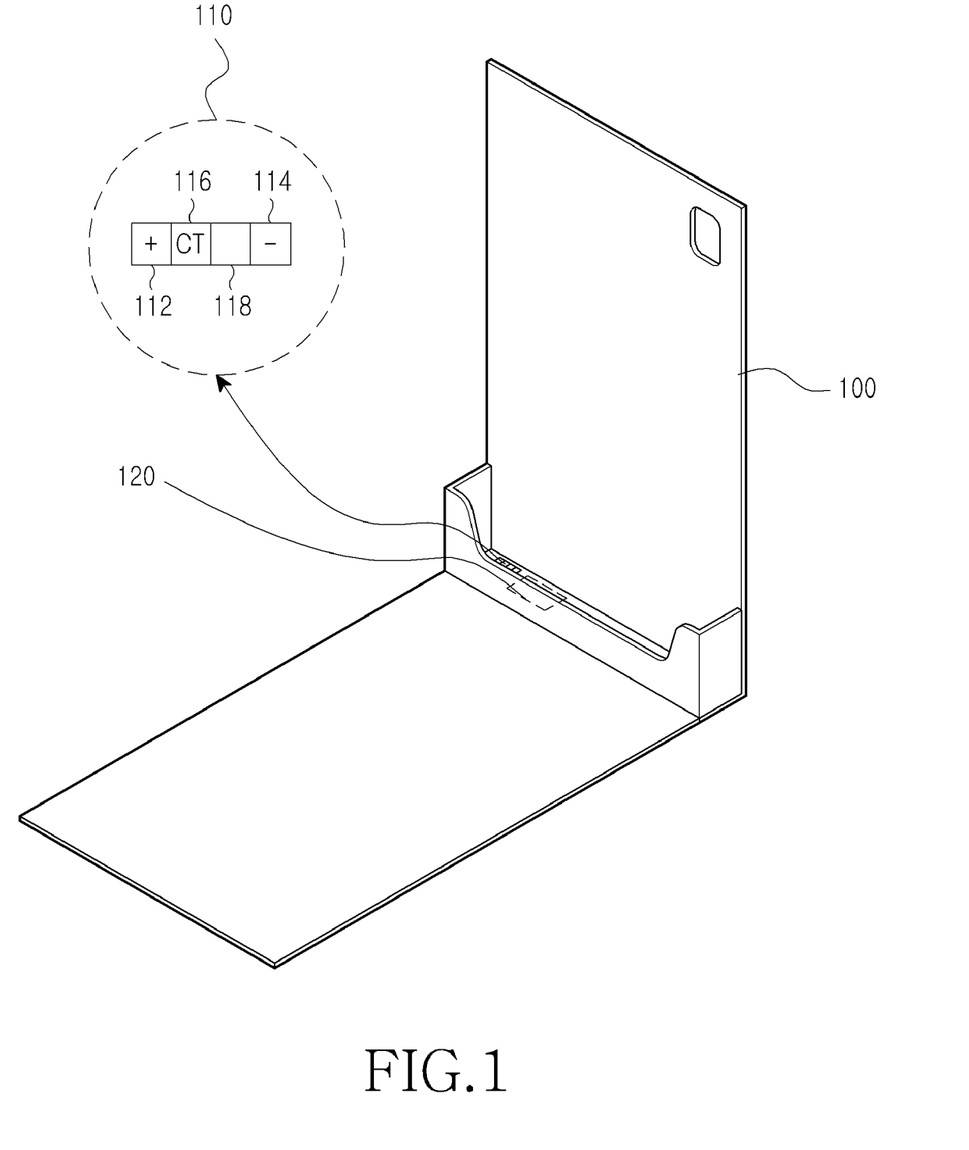
FIG. 1 is a diagram illustrating an external case with a vibration control apparatus of a mobile terminal according to a first exemplary embodiment of the present invention.
Figure 2:
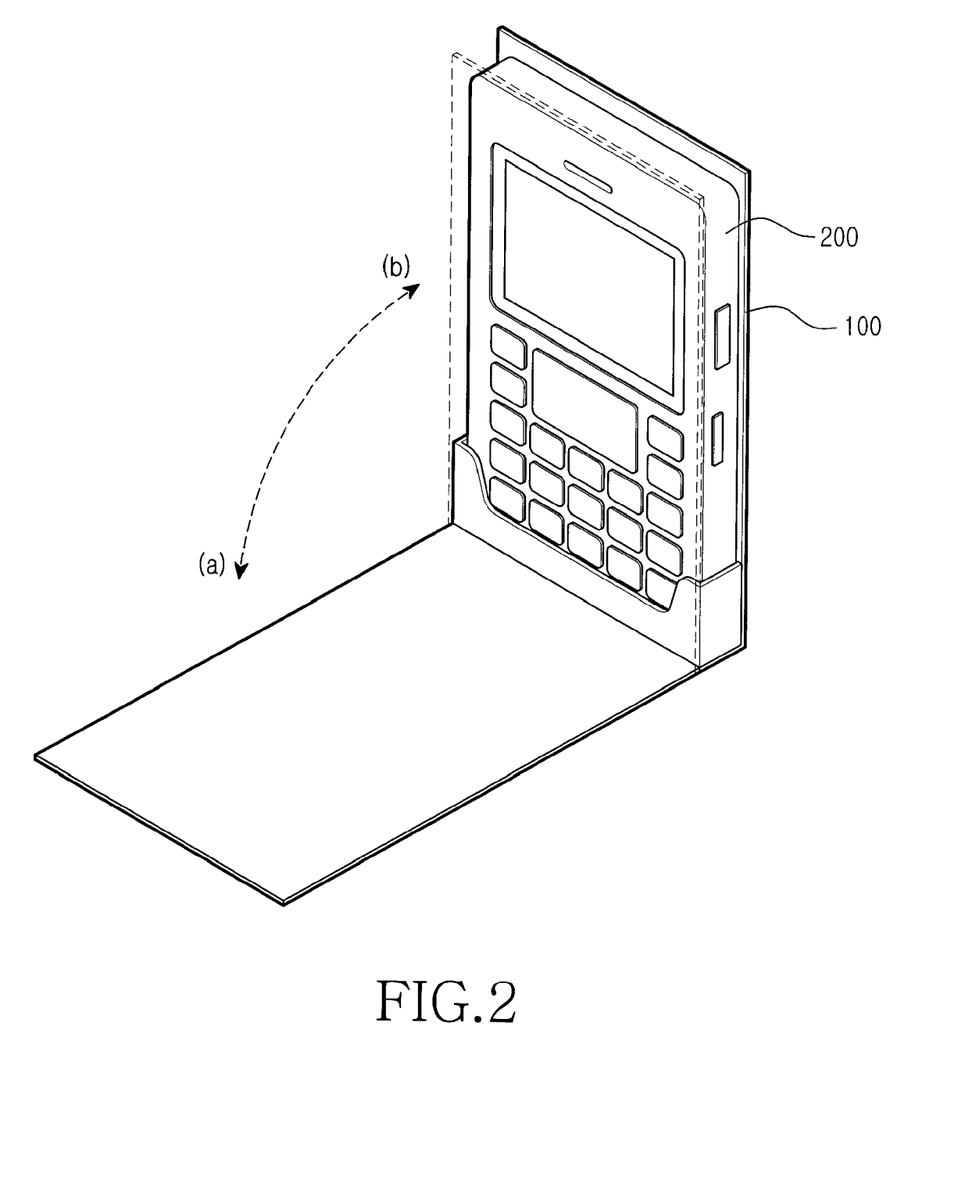
FIG. 2 is a diagram illustrating a detailed structure of an external case according to the first exemplary embodiment of the present invention.

FIG. 1 is a diagram illustrating an external case with a vibration control apparatus of a mobile terminal according to a first exemplary embodiment of the present invention, and FIG. 2 is a diagram illustrating a detailed structure of an external case according to the first exemplary embodiment of the present invention.

As illustrated in FIGS. 1 and 2, an external case 100 is attachable and detachable to/from a mobile terminal 200 through a first connector 110. The external case 100 may have a shape corresponding to an external battery including the first vibrator 120. The mobile terminal 200, when it electrically connects with a first connector 110 in an external case 100, can detect (sense) its connection to a first vibrator 120 in the external case 100 through a current feedback signal flowing through a Cognition Terminal (CT) 116. Thereafter, the mobile terminal 200 is provided with power from an external battery (not shown) via power terminals 112 and 114. Herein, CT can be a "Current Feedback (CF) Terminal" or a "Voltage Feedback (VF) Terminal", but CT will be described as a "Current Feedback Terminal" in the exemplary embodiments of the present invention.

On the other hand, the mobile terminal 200, when it is not electrically connected with the first connector 110 in the external case 100, determines (judges) that the external case 100 is detached therefrom, since no current feedback signal is detected to be flowing though the CT 116.

The external case 100 according to an exemplary embodiment of the present invention is attachable and detachable to/from the mobile terminal 200 through the first connector 110. The external case 100 further includes the first vibrator 120 that drives or runs in response to a key input on the mobile terminal 200.

The first connector 110 includes the two power terminals 112 and 114, the CT 116, and a control terminal 118. In addition, the external case 100 includes an external battery (not shown) that electrically connects to the mobile terminal 200 through the power terminals 112 and 114 of the first connector 110, and provides power thereto.

The external case 100, unlike a conventional case, includes therein the first vibrator 120 connected to the control terminal 118. That is, the first vibrator 120 is mounted in the external case 100, which has a lower internal complexity than that of the mobile terminal 200, thereby facilitating easy manufacturing.

As illustrated in FIG. 2, the external case 100 is opened, for example, at a position (a) when the user uses the mobile terminal 200, and is closed, for example, at a position (b) when the user protects (or does not use) the mobile terminal 200.

Figure 3:
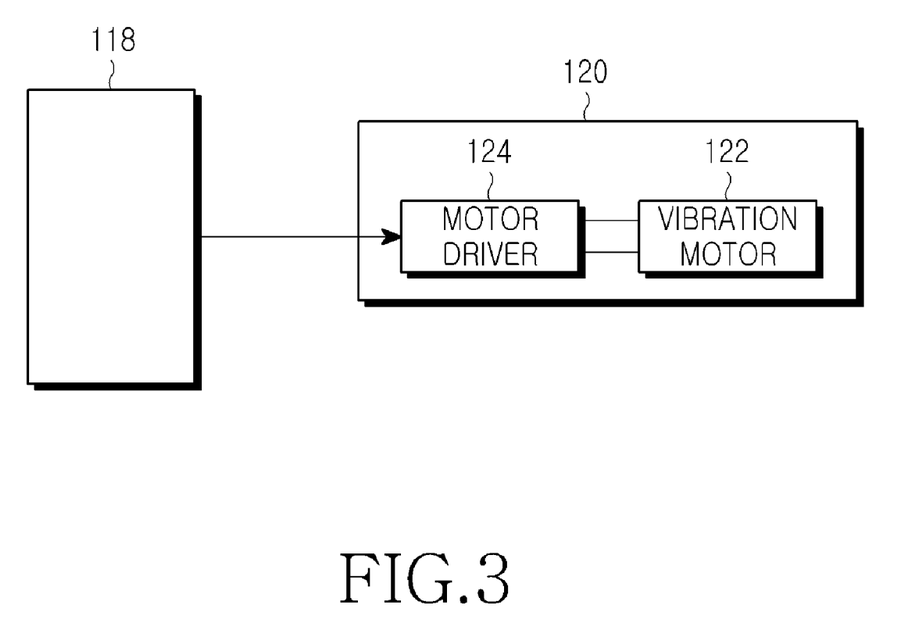
FIG. 3 is a diagram schematically illustrating a structure of a first vibrator according to the first exemplary embodiment of the present invention.

FIG. 3 is a diagram schematically illustrating a structure of a first vibrator according to the first exemplary embodiment of the present invention.

As illustrated in FIG. 3, the first vibrator 120 includes a vibration motor 122 and a motor driver 124 that drives the vibration motor 122 to vibrate. The motor driver 124 may drive the vibration motor 122 to vibrate when a user enters an input through a key input unit (235 of FIG. 5) or a touchscreen (242 of FIG. 5) of the mobile terminal 200.

The first vibrator 120, when coupled to the mobile terminal 200, is activated in response to a drive signal (or an enable signal) Motor_EN received through the control terminal 118 and outputs a haptic feedback such as shaking, vibration and the like.

The motor driver 124 serves to drive the vibration motor 122 by providing battery power thereto when it is activated in response to the drive signal Motor_EN received from the mobile terminal 200. When the drive signal Motor_EN applied from the mobile terminal 200 to the first vibrator 120 is a Pulse Width Modulation (PWM) control signal, the vibration motor 122 periodically outputs a haptic feedback in response to the control signal.

The first vibrator 120 can be a multi-function actuator that operates as described hereafter. When the user enters an input through the key input unit 235 or the touchscreen 242 after the first vibrator 120 is coupled to the mobile terminal 200, the first vibrator 120 is activated in response to the drive signal Motor_EN received through the control terminal 118, and automatically generates a vibration of the vibration motor 122 depending on a sound output level of the sound being output through an audio processor (220 of FIG. 5) of the mobile terminal 200. Herein, the multi-function actuator is complex in that as a preset frequency is input to a vibration coil, a vibration object with a magnet attached thereto causes resonance, thereby generating a vibration, and a signal is applied to a voice coil, making a sound.

That is, the first vibrator 120 is provided with battery power, and adjusts a current being applied to the vibration motor 122. However, the current control can be adjusted according to the sound output level being output from the audio processor 220 of the mobile terminal 200. That is, when the sound output level is high, the motor driver 124 applies a large current to the vibration motor 122, and when the sound output level is low, the motor driver 124 applies a small current to the vibration motor 122. In this way, the motor driver 124 drives the vibration motor 122.

Figure 4:
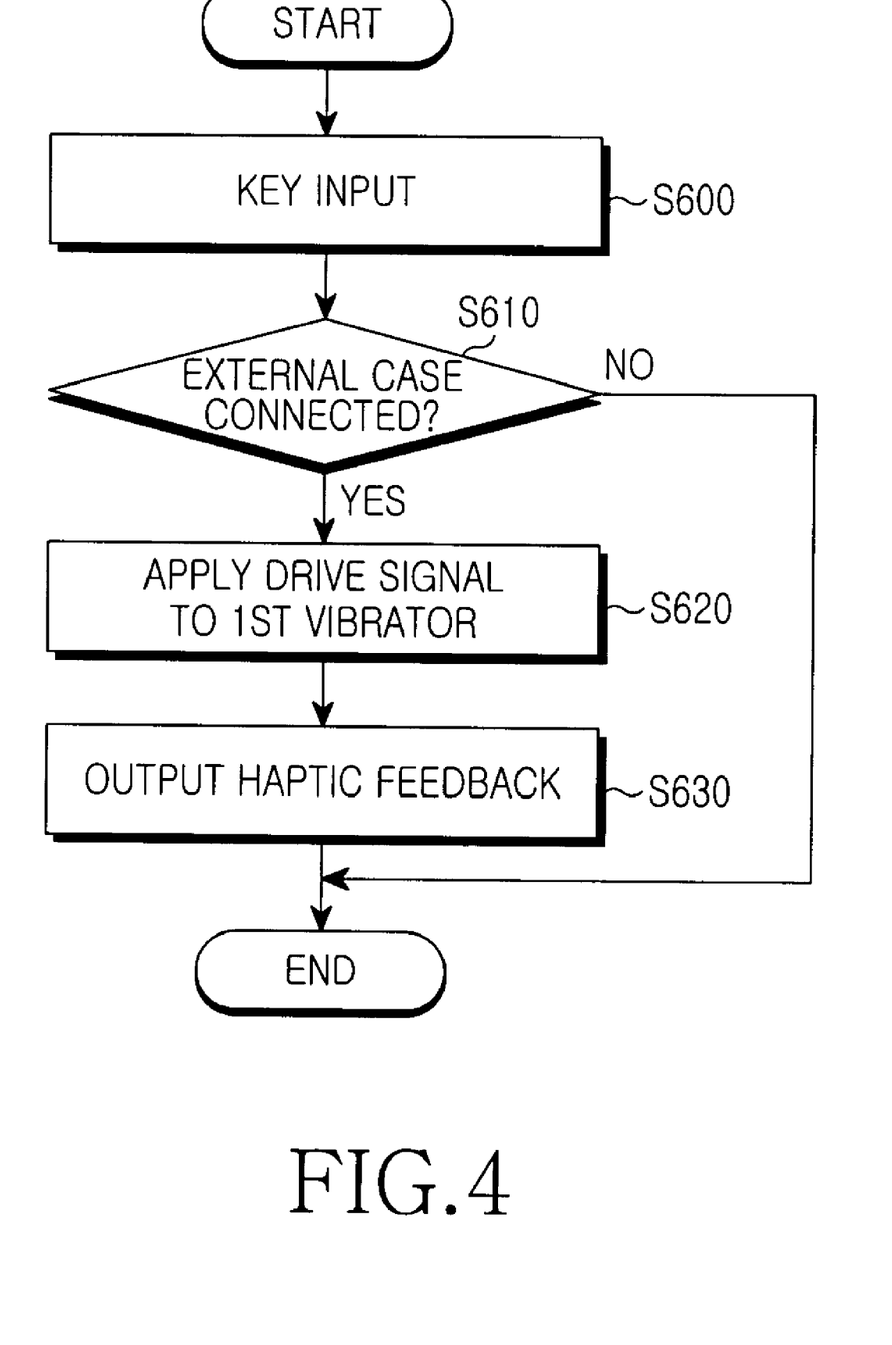
FIG. 4 is a flowchart illustrating a vibration control method in a mobile terminal according to the first exemplary embodiment of the present invention.

FIG. 4 is a flowchart illustrating a vibration control method in a mobile terminal according to the first exemplary embodiment of the present invention.

Referring to FIG. 4, if the user enters an input through the key input unit 235 or the touchscreen 242 in step S600, the mobile terminal 200 determines in step S610 attachment/detachment of the external case 100 depending on detection/non-detection of a current feedback signal through the Cognition Terminal (CT) 116 as it connects to the external case 100. That is, the mobile terminal 200 can determine whether the first vibrator 120 is detected through the CT 116 as the mobile terminal 200 connects with the external case 100.

Upon detecting a current feedback signal, the mobile terminal 200 applies a drive signal Motor_EN to the first vibrator 120 via the control terminal 118 in step S620, when it is determined that the external case 100 is connected thereto.

Upon receipt of the drive signal Motor_EN, the first vibrator 120, under the control of the mobile terminal 200, is activated to output a haptic feedback such as a shaking, a vibration and the like while changing the vibration strength and vibration period in step S630.

Returning to step S610, if the mobile terminal 200 is not connected to the external case 100 or if no current feedback signal is detected despite being connected to the external case 100, the mobile terminal 200 determines that the external case 100 is not connected thereto and ends the process. Therefore, the mounting space in the mobile terminal, required for mounting the vibration device, can be minimized, thereby providing a high vibration force while maintaining the miniaturization of the mobile terminal.

Meanwhile, the first vibrator 120 can be activated to output a haptic feedback depending on a sound output level of the sound being output from the audio processor 220 of the mobile terminal 200, making it possible to provide the improved presence and verisimilitude and thus improve convenience to the user.

Figure 5:
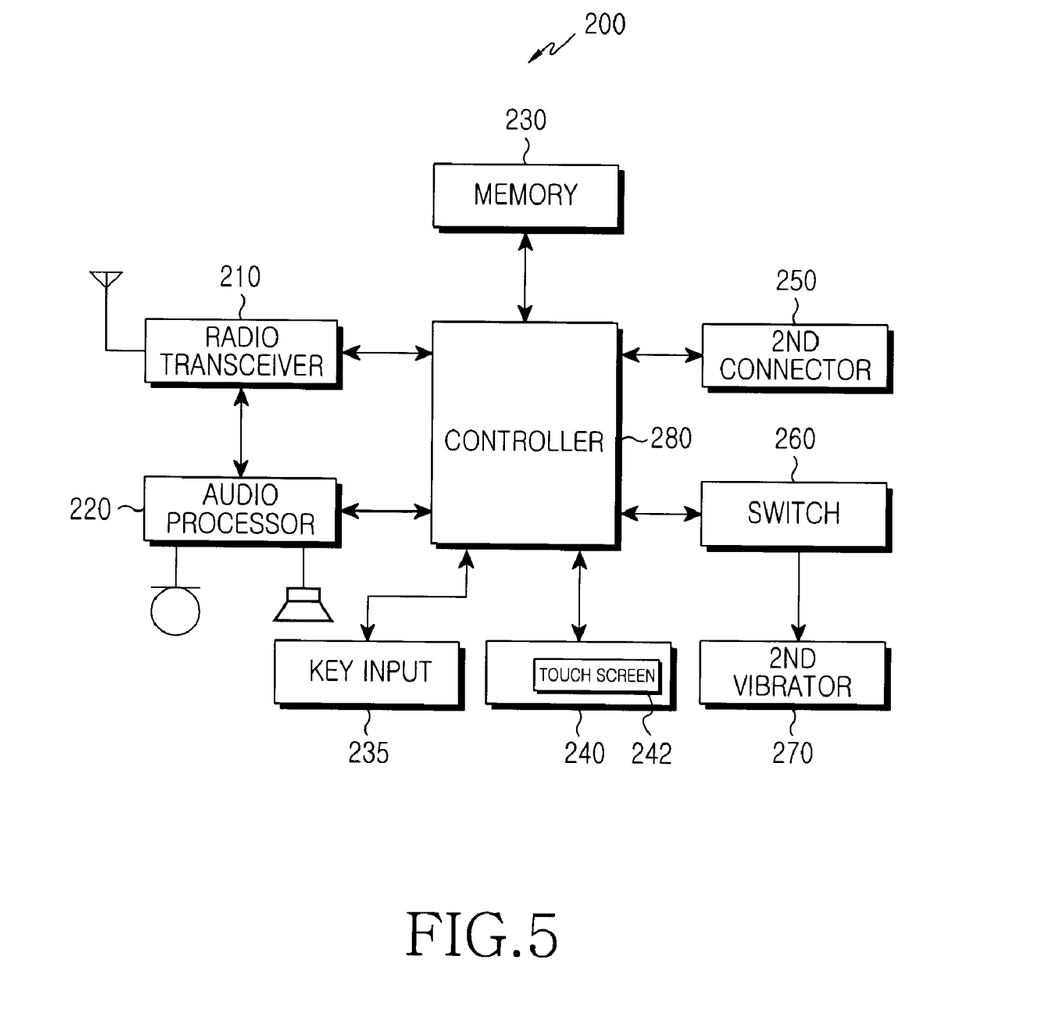
FIG. 5 is a diagram schematically illustrating an internal structure of a vibration control apparatus in a mobile terminal according to a second exemplary embodiment of the present invention.

FIG. 5 is a diagram schematically illustrating an internal structure of a vibration control apparatus in a mobile terminal according to a second exemplary embodiment of the present invention.

As illustrated in FIG. 5, a mobile terminal 200 according to the second exemplary embodiment of the present invention includes a radio transceiver 210, an audio processor 220, a memory 230, a key input unit 235, a display 240, a second connector 250, a switch 260, a second vibrator 270, and a controller 280.

As described above with respect to FIGS. 1 and 2, the external case 100 is attachable and detachable to/from the mobile terminal 200 through the first connector 110. The external case 100 may have a shape of an external battery including the first vibrator 120.

The first vibrator 120, when it is coupled to the mobile terminal 200, is activated in response to a drive signal Motor_EN received through the control terminal 118 and outputs a haptic feedback such as a shaking, vibration and the like. The first vibrator 120 can be a multi-function actuator that operates as described hereafter. When the user enters an input through the key input unit 235 or the touchscreen 242, after the first vibrator 120 has been connected to the mobile terminal 200, the first vibrator 120 is activated in response to the drive signal Motor_EN received through the control terminal 118, and automatically generates a vibration of the vibration motor 122 depending on a sound output level of the sound being output through the audio processor 220 of the mobile terminal 200.

The radio transceiver 210 includes a Radio Frequency (RF) unit and a Modulator/Demodulator (MODEM). The RF unit includes an RF transmitter for frequency-up-converting and amplifying signals to be transmitted, and an RF receiver for low-noise-amplifying and frequency-down-converting received signals. The MODEM encodes and modulates transmission signals, and demodulates and decodes signals received from the RF unit.

The audio processor 220 can be comprised of a codec (coder/decoder), and the codec includes a data codec and an audio codec. The data codec processes packet data, and the audio codec processes audio signals such as voice, multimedia file, etc. The audio processor 220 converts a digital audio signal received from the MODEM into an analog audio signal by means of the audio codec, and reproduces the audio signal through a speaker. On the other hand, the audio processor 220 converts an analog audio signal generated from a microphone into a digital audio signal by means of the audio codec, and transfers the digital audio signal to the MODEM. The codec can be separately provided, or can be included in the controller 280.

The memory 230 can be comprised of a program memory and a data memory. The program memory stores therein programs for controlling the overall operation of the mobile terminal 200.

The key input unit 235 includes function keys used for setting various functions of the mobile terminal 200, and further includes multiple keys by which the user selects and inputs information. The key input unit 235 converts a key input pressed by the user into a preset voltage signal, and provides the voltage signal to the controller 280.

The display 240 can be comprised of a Liquid Crystal Display (LCD), an Organic Light Emitting Diodes (OLED) or the like, and outputs various display information generated by the mobile terminal 200. The display 240 can include a touchscreen 242 to operate as an input unit for controlling the mobile terminal 200. The display 240 may be provided power from the external battery. In addition, the display 240, according to an exemplary embodiment of the present invention, may be provided power from an internal battery of the mobile terminal 200 after detachment of the external battery. Furthermore, the display may output information to the user on the expected amount of operational time of the mobile terminal, corresponding to a remaining battery level of at least one of the external and internal batteries.

The touchscreen 242, which is a panel to which a touch input is applied from the user according to an exemplary embodiment of the present invention, outputs an input signal to the controller 280 upon receiving the touch input from the user. That is, the touchscreen 242 is a touch sensor-based key pad, and an input through the touchscreen 242 is equal to the normal key input as the touchscreen 242 may use coordinates, pressure, capacitance, or the like at an input point.

However, unlike the conventional touch pad, the touchscreen 242 according to an exemplary embodiment of the present invention outputs haptic sensations to the user who is physically touching the touchscreen 242, in response to the haptic feedback provided by the first and second vibrators 120 and 270.

The second connector 250 has terminals which are connected on a one-to-one basis to the power terminals 112 and 114, the Cognition Terminal (CT) 116 and the control terminal 118 of the first connector 110 provided in the external case 100. The second connector 250 is provided with power from the external battery by means of its connection to the power terminals 112 and 114.

The switch 260 electrically switches the second vibrator 270 to the controller 280 according to a switching control signal generated from the controller 280.

The second vibrator 270, which is connected to the controller 280 by the switch 260, is activated in response to a drive signal Motor_EN received from the controller 280 to output a haptic feedback such as a shaking, vibration and the like.

The controller 280 controls the overall operations of the mobile terminal 200 and/or switches/controls an operational mode of the mobile terminal 200. If the user enters an input through the key input unit 235 or the touchscreen 242, the controller 280 determines attachment/detachment of the external case 100 according to detection/non-detection of a current feedback signal flowing through the CT 116.

The controller 280 can determine that the mobile terminal 200 is connected to the external case 100, upon detecting the current feedback signal through the CT 116, and can determine that the mobile terminal 200 is disconnected from the external case 100, upon detecting no current feedback signal.

Upon detecting the current feedback signal through the CT 116, the controller 280 controls the first vibrator 120 to drive the vibration motor 122. That is, upon detecting the first vibrator 120, the controller 280 generates a switching-off control signal to disable the second vibrator 270, and turns off the switch 260 to apply a drive signal Motor_EN to the first vibrator 120 through the control terminal 118. Upon receipt of the drive signal Motor_EN, the first vibrator 120 is activated to output a haptic feedback such as a shaking, vibration and the like.

However, when the mobile terminal 200 is not connected to the external case 100 through the second connector 250 or detects no current feedback signal even though it is connected to the external case 100, the controller 280 generates a switching-on control signal to enable the second vibrator 270, and turns on the switch 260 to apply a drive signal to the second vibrator 270. Upon receipt of the drive signal Motor_EN, the second vibrator 270 is activated to output a haptic feedback such as a shaking, vibration and the like.

Figure 6:
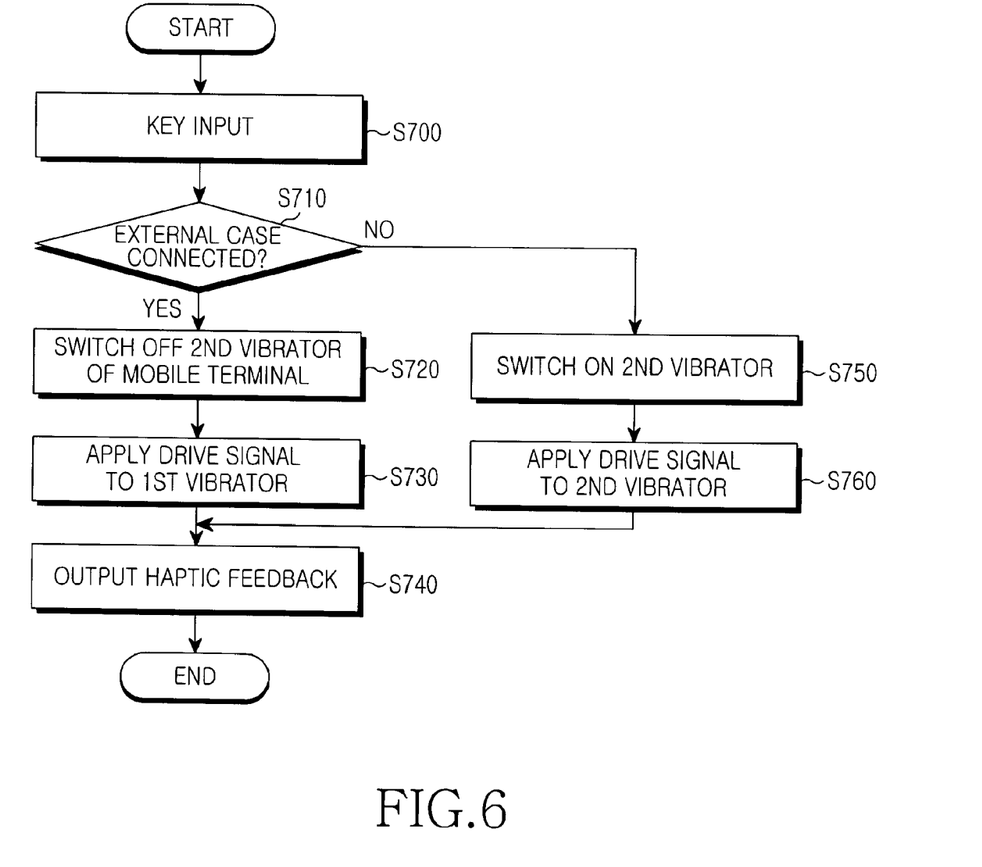
FIG. 6 is a flowchart illustrating a vibration control method in a mobile terminal according to the second exemplary embodiment of the present invention.

FIG. 6 is a flowchart illustrating a vibration control method in a mobile terminal according to the second exemplary embodiment of the present invention.

As illustrated in FIG. 6, when the user enters an input through the key input unit 235 or the touchscreen 242 in step S700, the mobile terminal 200 determines in step S710 attachment/detachment of the external case 100 depending on detection/non-detection of a current feedback signal through the Cognition Terminal (CT) 116 as it is connected to the external case 100. That is, the mobile terminal 200 can determine whether the first vibrator 120 is detected through the CT 116 as the mobile terminal 200 connects with the external case 100.

Upon detecting the current feedback signal, the mobile terminal 200 determines that it is connected with the external case 100 and generates a switching-off control signal to disable the second vibrator 270 in step S720. The mobile terminal 200 then turns off the switch 260 to apply a drive signal Motor_EN to the first vibrator 120 through the control terminal 118 in step S730.

Upon receipt of the drive signal Motor_EN, the first vibrator 120, under the control of the mobile terminal 200, is activated to output a haptic feedback such as a shaking, vibration and the like in step S740 while changing the vibration strength and vibration period.

In this case, the first vibrator 120 can be activated to output a haptic feedback depending on a sound output level together with the sound being output through the audio processor 220 of the mobile terminal 200, thereby making it possible to provide the improved presence and verisimilitude and thus improve convenience to the user.

Returning to step S710, when the mobile terminal 200 does not connect with the external case 100 or detects no current feedback signal even though it connects with the external case 100, the mobile terminal 200 determines that it has not connected to the external case 100 and generates a switching-on control signal to enable the second vibrator 270 in step S750. The mobile terminal 200 then turns on the switch 260 in step S760 to apply a drive signal Motor_EN to the second vibrator 270 in step S760.

Upon receipt of the drive signal Motor_EN, the second vibrator 270, under the control of the mobile terminal 200, is activated to output a haptic feedback such as a shaking, vibration and the like in step S740, thereby increasing the vibration force so that the user can easily recognize the vibration.

Figure 7:
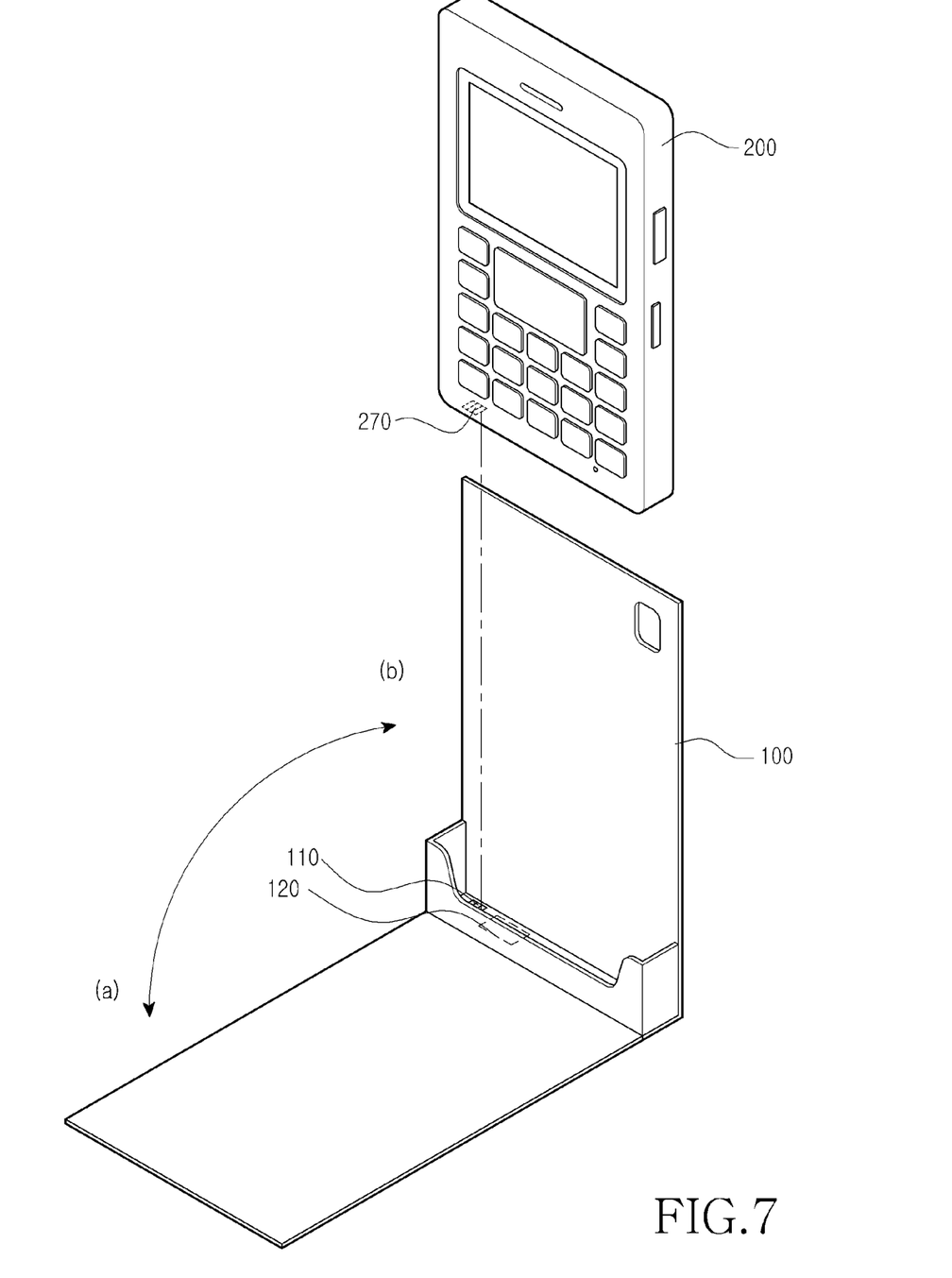
FIG. 7 is a diagram illustrating a mobile terminal and an external case with a vibration control apparatus according to a third exemplary embodiment of the present invention.

FIG. 7 is a diagram illustrating a mobile terminal and an external case with a vibration control apparatus according to a third exemplary embodiment of the present invention.

As illustrated in FIG. 7, the external case 100 is opened, for example, at a position (a) when the user uses the mobile terminal 200, and is closed, for example, at a position (b) when the user protects (or does not use) the mobile terminal 200.

When the mobile terminal 200, according to the third exemplary embodiment of the present invention, electrically connects with the first connector 110 of the external case 100, it can detect its connection to the first connector 110 of the external case 100 through a current feedback signal flowing through the Cognition Terminal (CT) 116. Thereafter, the mobile terminal 200 is provided with power from the external battery through the power terminals 112 and 114.

For example, when the user enters an input through the key input unit 235 or the touchscreen 242, the controller 280 determines attachment/detachment of the external case 100 according to detection/non-detection of the current feedback signal flowing through the CT 116.

Upon detecting the current feedback signal through the CT 116, the controller 280 can determine that it is connected to the external case 100, and upon detecting no current feedback signal, the controller 280 can determine that it is disconnected from the external case 100.

Upon detecting the current feedback signal through the CT 116, the controller 280 applies a drive signal Motor_EN to enable the first vibrator 120.

As the controller 280 can enable the second vibrator 270 without connecting a separate switch, it can simultaneously output a haptic feedback together with the first vibrator 120 enabled by the drive signal Motor_EN received through the control terminal 118 on an interactive basis.

The first vibrator 120 can be a multi-function actuator that operates as described hereafter. When the first vibrator 120 connects with the mobile terminal 200 and the user enters an input through the key input unit 235 or the touchscreen 242, the first vibrator 120 is activated in response to the drive signal Motor_EN received through the control terminal 118, and automatically generates vibration of the vibration motor 122 depending on a sound output level of the sound being output from the audio processor 220 of the mobile terminal 200.

Figure 8:
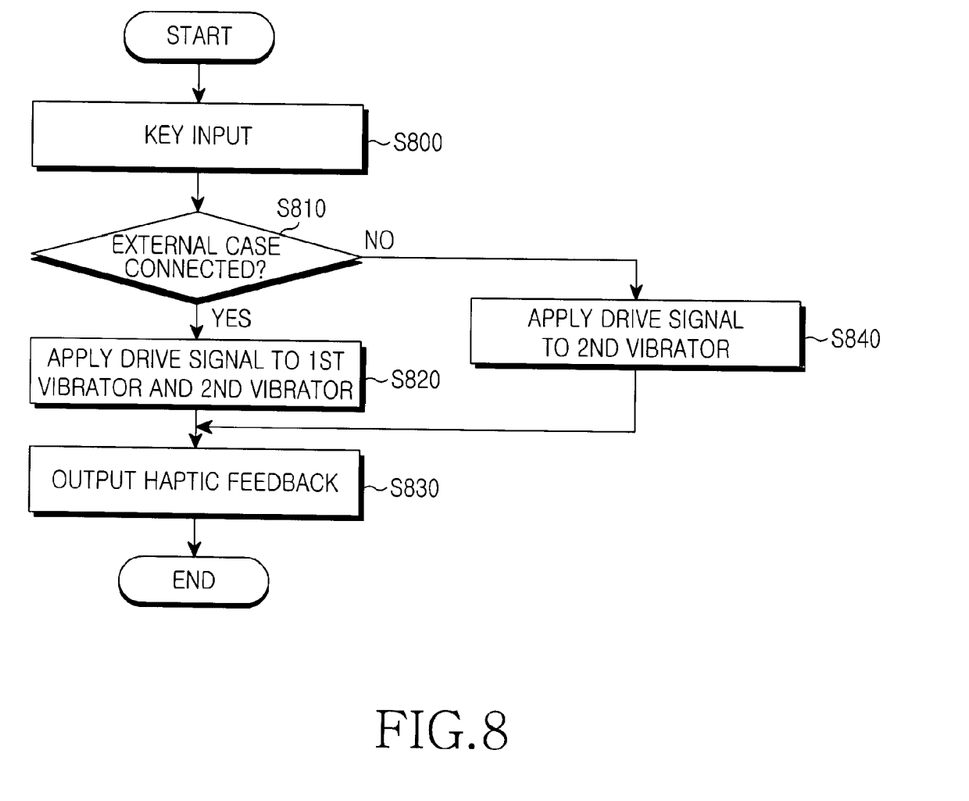
FIG. 8 is a flowchart illustrating a vibration control method in a mobile terminal according to the third exemplary embodiment of the present invention.

FIG. 8 is a flowchart illustrating a vibration control method in a mobile terminal according to the third exemplary embodiment of the present invention.

As illustrated in FIG. 8, when the user enters an input through the key input unit 235 or the touchscreen 242 in step S800, the mobile terminal 200 determines in step S810 attachment/detachment of the external case 100 depending on detection/non-detection of a current feedback signal through the Cognition Terminal (CT) 116 as it connects to the external case 100 with the first vibrator 120.

Upon detecting the current feedback signal, the mobile terminal determines that it connects with the external case 100 and applies a drive signal Motor_EN to the first vibrator 120 through the control terminal 118, and simultaneously, applies a drive signal Motor_EN to the second vibrator 270 in step S820.

Upon receipt of the drive signal Motor_EN, the first vibrator 120 and the second vibrator 270, under the control of the mobile terminal 200, simultaneously output haptic feedback on an interactive basis in step S830, thereby delivering various dynamic vibrations to the user.

Returning to step S810, when the mobile terminal 200 does not connect with the external case 100 or detects no current feedback signal even though it connects to the external case 100, the mobile terminal 200 determines that it is not connected to the external case 100 and applies a drive signal Motor_EN to enable the second vibrator 270 in step S840.

Upon receipt of the drive signal Motor_EN, the second vibrator 270, under the control of the mobile terminal 200, is activated to output a haptic feedback such as shaking, vibration and the like in step S830.

In this case, the first vibrator 120 can be activated to output the haptic feedback depending on a sound output level of the sound being output through the audio processor 220 of the mobile terminal 200, making it possible to provide the improved presence and verisimilitude and thus improve convenience to the user.

As is apparent from the foregoing description, exemplary embodiments of the present invention can determine attachment/detachment of an external case depending on detection/non-detection of a current feedback signal from the external case with a vibrator, and control the vibrator to output a haptic feedback, to minimize the required mounting space of a mobile terminal, thereby providing a high vibration force despite miniaturization of the mobile terminal.

Furthermore, exemplary embodiments of the present invention can determine attachment/detachment of an external case depending on detection/non-detection of a current feedback signal from the external case with a vibrator, and control the vibrator and/or a mobile terminal to output a haptic feedback, to increase a vibration force and enables a user to easily recognize the vibration.

Moreover, exemplary embodiments of the present invention can enable a vibrator mounted in an external case and a mobile terminal to simultaneously output haptic feedback on an interactive basis to deliver various dynamic vibrations to the user.

In addition, exemplary embodiments of the present invention can determine attachment/detachment of an external case depending on detection/non-detection of a current feedback signal from the external case with a vibrator, and control the vibrator to output a haptic feedback according to a sound output level together with the sound being output from a mobile terminal, thereby providing improved presence and verisimilitude and thus improving convenience to the user.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling vibration in a mobile terminal, the apparatus comprising:
   a first connector that is attachable and detachable with a mobile terminal; and
   an external case including a first vibrator electrically connected to the first connector,
   wherein when the mobile terminal connects with the external case through the first connector, the mobile terminal detects and enables operation of the first vibrator, and
   wherein the external case encompasses the mobile terminal.

2. The apparatus of claim 1, wherein the first connector comprises:
   power terminals for providing power to the mobile terminal;

a cognition terminal used for determining at least one of connection and disconnection of the external case and the mobile terminal; and a control terminal used by the mobile terminal to control the first vibrator.

3. The apparatus of claim 2, wherein the external case includes an external battery for providing power to the mobile terminal through the power terminals.

4. The apparatus of claim 1, wherein the first vibrator is activated in response to a drive signal received from the mobile terminal through the first connector to output a haptic feedback.

5. The apparatus of claim 4, wherein the first vibrator is a multi-function actuator that is activated in response to a drive signal received from the mobile terminal through the first connector, and outputs a haptic feedback depending on a sound output level of a sound being output from the mobile terminal.

6. The apparatus of claim 1, wherein the mobile terminal comprises:
a second connector which is connected to the first connector of the external case;
a controller for generating a switching control signal to enable at least one of the first vibrator and a second vibrator based on one of a detection and non-detection of a current feedback signal at the second connector;
a switch for enabling operation of the second vibrator according to the switching control signal generated from the controller; and
the second vibrator which is activated in response to a drive signal received from the switch, for outputting a haptic feedback.

7. The apparatus of claim 6, wherein the controller determines that the mobile terminal is connected to the external case, upon detecting the current feedback signal, and determines that the mobile terminal is disconnected from the external case, upon detecting no current feedback signal.

8. The apparatus of claim 7, wherein upon detecting the current feedback signal, the controller controls the switch to disable operation of the second vibrator and apply a drive signal to the first vibrator.

9. The apparatus of claim 7, wherein upon detecting no current feedback signal, the controller controls the switch to enable operation of the second vibrator and apply a drive signal to the second vibrator.

10. The apparatus of claim 6, wherein the controller controls the first vibrator and the second vibrator to simultaneously output haptic feedback on an interactive basis.

11. An apparatus for controlling vibration in a mobile terminal, the apparatus comprising:
a first connector that is attachable and detachable with a mobile terminal;
an external case including a first vibrator electrically connected to the first connector; and
a controller for, when the mobile terminal is connected to the external case through the first connector, determining at least one of attachment and detachment of the external case, and for controlling the first vibrator and a second vibrator in the mobile terminal to simultaneously output haptic feedback on an interactive basis.

12. The apparatus of claim 11, wherein the first connector comprises:
power terminals for providing power to the mobile terminal;
a cognition terminal used for the determining of the at least one of connection and disconnection of the external case and the mobile terminal; and a control terminal used for the mobile terminal to control the first vibrator.

13. The apparatus of claim 12, wherein the external case includes an external battery for providing power to the mobile terminal through the power terminals.

14. The apparatus of claim 11, wherein the first vibrator is activated in response to a drive signal received from the mobile terminal through the first connector to output a haptic feedback.

15. The apparatus of claim 14, wherein the first vibrator is a multi-function actuator that is activated in response to a drive signal received from the mobile terminal through the first connector, and outputs a haptic feedback depending on a sound output level of a sound being output from the mobile terminal.

16. The apparatus of claim 11, wherein the controller determines that the mobile terminal is connected to the external case, upon detecting a current feedback signal, and determines that the mobile terminal is not connected to the external case, upon detecting no current feedback signal.

17. A method for controlling vibration in a mobile terminal, the method comprising:
upon detecting a key input by a user, determining whether a current feedback signal is detected when an external case with a first vibrator is connected to the mobile terminal;
upon detecting the current feedback signal, determining that the external case is connected to the mobile terminal and applying a drive signal to the first vibrator; and
controlling the first vibrator to be activated in response to the received drive signal to output a haptic feedback,
wherein the external case encompasses the mobile terminal.

18. The method of claim 17, wherein the determining of whether the current feedback signal is detected comprises:
determining that the mobile terminal is connected to the external case, upon detecting the current feedback signal; and
determining that the mobile terminal is disconnected from the external case, upon detecting no current feedback signal.

19. The method of claim 17, wherein the controlling of the first vibrator comprises:
controlling the first vibrator to be activated in response to the received drive signal to output a haptic feedback depending on a sound output level of a sound being output from the mobile terminal.

20. A method for controlling vibration in a mobile terminal, the method comprising:
upon detecting a key input by a user, determining whether a current feedback signal is detected when an external case with a first vibrator is connected to the mobile terminal;
upon detecting the current feedback signal, generating a switching-off control signal;
applying a drive signal to the first vibrator according to the switching-off control signal; and
controlling the first vibrator to be activated in response to the received drive signal to output a haptic feedback,
wherein the external case encompasses the mobile terminal.

21. The method of claim 20, further comprising:
when the external case with the first vibrator is not connected to the mobile terminal, generating a switching-on control signal to enable operation of a second vibrator;
applying a drive signal to the second vibrator according to the switching-on control signal; and controlling the second vibrator to be activated in response to the received drive signal to output a haptic feedback.

22. The method of claim 20, wherein the determining whether the current feedback signal is detected comprises:
   determining that the mobile terminal is connected to the external case, upon detecting the current feedback signal; and
   determining that the mobile terminal is disconnected from the external case, upon detecting no current feedback signal.

23. The method of claim 22, further comprising:
   when the current feedback signal is not detected, generating a switching-on control signal to enable operation of a second vibrator;
   applying a drive signal to the second vibrator according to the switching-on control signal; and
   controlling the second vibrator to be activated in response to the received drive signal to output a haptic feedback.

24. The method of claim 20, wherein the controlling of the first vibrator comprises:
   controlling the first vibrator to be activated in response to the received drive signal to output a haptic feedback depending on a sound output level of a sound being output from the mobile terminal.

25. The method of claim 20, wherein the controlling of the first vibrator comprises:
   controlling the first vibrator to be activated in response to the received drive signal to simultaneously output a haptic feedback together with a second vibrator in the mobile terminal on an interactive basis.

26. A method for controlling vibration in a mobile terminal, the method comprising:
   upon detecting a key input by a user, determining whether a current feedback signal is detected when an external case with a first vibrator is connected to the mobile terminal;
   upon detecting the current feedback signal, determining that the external case is connected to the mobile terminal and applying drive signals to the first vibrator and a second vibrator in the mobile terminal; and
   controlling the first vibrator and the second vibrator to be activated in response to the received drive signal to simultaneously output haptic feedback on an interactive basis.

27. The method of claim 26, wherein the determining of whether the current feedback signal is detected comprises:
   determining that the mobile terminal is connected to the external case, upon detecting the current feedback signal; and
   determining that the mobile terminal is disconnected from the external case, upon detecting no current feedback signal.

28. The method of claim 27, further comprising:
   when the current feedback signal is not detected, determining that the external case is not connected to the mobile terminal and applying a drive signal to enable operation of the second vibrator; and
   controlling the second vibrator to be activated in response to the received drive signal to output a haptic feedback.

* * * * *